Aug. 27, 1963     T. D. HEATH ET AL     3,102,092
FLUIDIZED BED CLASSIFIER
Filed June 1, 1961
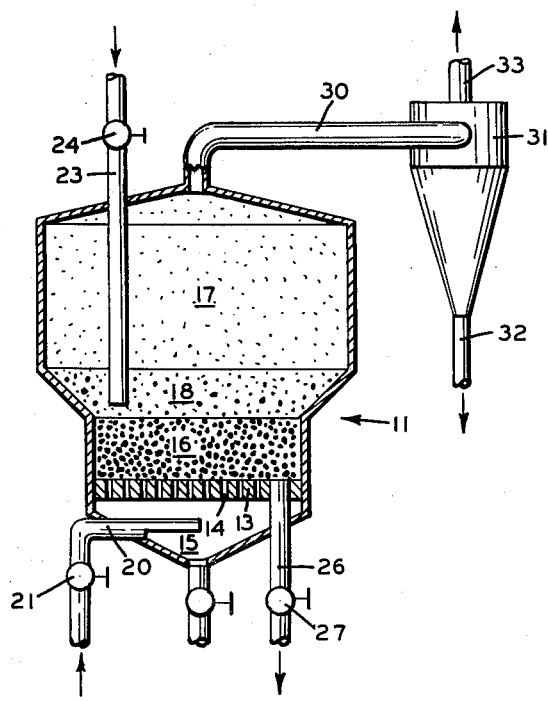
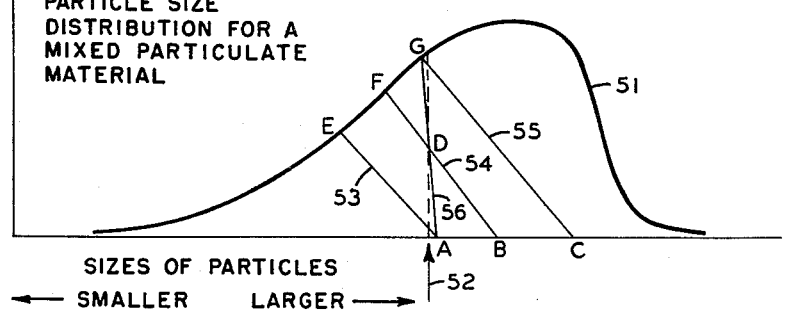
INVENTORS.
THOMAS D. HEATH
LEONARD ACONSKY
BY
Philip Mintz
ATTORNEY.

United States Patent Office 3,102,092
Patented Aug. 27, 1963

3,102,092
FLUIDIZED BED CLASSIFIER
Thomas D. Heath and Leonard Aconsky, Westport, Conn., assignors to Dorr-Oliver Incorporated, Stamford, Conn., a corporation of Delaware
Filed June 1, 1961, Ser. No. 114,234
9 Claims. (Cl. 209—140)

This invention relates to a method and apparatus for the classification of solid particles according to size, and more particularly to classification by subjecting such particles to the influence of an uprising stream of gas moving at such velocity as to carry with it those particles smaller than a preselected size.

It is well known that solid particles falling through a viscous medium, whether gaseous or liquid, do not fall at the same velocity. Among the factors producing differences in velocity of free fall of particles may be mentioned such factors as the size and shape of the particles, the weight or specific gravity of the particles, and the viscosity and density of the fluid medium through which the particles fall.

Because of this phenomenon, it is possible to separate particles of differing sizes and/or differing densities by making use of the differing rates of fall thereof through a viscous medium. This separation theoretically can be accomplished by introducing a mixture of particles into an uprising stream of gas moving at such a velocity that smaller or lighter particles having a rate of free fall less than the gas velocity will rise and be carried out with the gas whereas larger or heavier particles having a rate of free fall greater than the gas velocity will fall through the gas in a downward direction. In order to simplify the description, reference will be made to a separation based on size, but it is to be understood that the same method and apparatus can also be used to produce a separation based on specific gravity, and it is therefore intended that the term "size" also includes a specific gravity.

In order to carry out such a separation on a practical basis, it has been proposed to fluidize a mixture of such particles in a cylindrical fluidized bed classifier utilizing a gas velocity sufficient to theoretically lift those particles which are smaller than a preselected size (which preselected size might also be called the size of separation). Unfortunately, in practice, such a separation is normally neither as sharp nor as efficient as would be desired. In attempting to operate such a fluidized solids classifier, it was found that a relatively large proportion of those particles which should have risen and been carried out with the gas remained in the fluidized bed and was discharged with the larger or heavier particles unless a very large volume of fluidizing gas was used for a relatively small amount of solid particles being treated by providing for an extended detention time of the particles in the fluidized bed.

It is an object of this invention to provide method and apparatus for greatly improving such a separation both as to sharpness (as reflected by minimizing the percentage of particles which leave admixed with the incorrect group of particles) and efficiency (as reflected by increasing the quantity of particles which can be separated by a given quantity of gas flow).

This object, and other objects which will become apparent as the specification proceeds, are primarily accomplished by subjecting the mixed particles to the action of an uprising stream of gas moving at a velocity great enough to lift particles of a size larger than the desired size of separation followed by a reduction in the velocity of the uprising stream of gas to a velocity equal to that required to just teeter a particle of the desired size of separation thereby allowing the larger particles previously lifted to fall back against the uprising current.

For a clearer understanding of this invention, reference may be had to the detailed description of an embodiment of this invention and to the accompanying drawing wherein:

FIGURE 1 is a schematic vertical sectional view of one form of apparatus suitable for carrying out this invention, and FIGURE 2 is a diagram useful for understanding one possible theoretical explanation of the invention.

Referring next to the drawing, and more particularly to FIGURE 1, there is shown a fluidized bed classifier 11 comprising generally a hollow chamber having a specific type of interior configuration as will hereinafter be described. Fluidized bed classifier 11, which may have a circular, rectangular, annular, or other cross-sectional shape, is provided near the bottom thereof with a foraminous constriction plate 13 having a plurality of orifices 14. This divides the classifier 11 to provide a plenum chamber 15 therebelow and it acts as a support for a fluidized bed in zone 16. Superposed above fluidized bed zone 16 is a freeboard zone 17 having a larger cross-sectional area than the fluidized bed zone 16 for purposes to be explained hereinafter. Between fluidized bed zone 16 and freeboard zone 17 is provided an expandingly tapered intermediate zone 18.

Fluidized bed classifier 11 is further provided with a plurality of conduits for admitting and removing material to and from within the classifier. A gas inlet means 20 provided with a suitable control means 21 is provided for introducing the fluidizing and classifying gas to plenum chamber 15. A conduit 23 provided with a suitable control means 24 is provided for introducing to the interior of classifier 11 the mixture of particles to be classified. A conduit 26 provided with a suitable control means 27 is appropriately positioned to remove particles from the fluidized bed 16 while maintaining the level of fluidized bed 16 substantially constant. A conduit 30 leading off from the upper portion of freebord 17 is provided for removing gases and entrained particles from classifier 11. Conduit 30 exhausts through a conventional dust cyclone 31 which separates the solid particles leaving through outlet 32 from the exhausting gases leaving through outlet 33.

In operation, the mixture of particles to be separated is introduced at a substantially constant rate through conduit 23 and is fluidized to form a fluidized bed in zone 16 by uprising fluidizing gas introduced through gas inlet 20. Control means 27 on conduit 26 is appropriately set so as to permit solid particles to leave the fluidized bed in zone 16 at the proper rate so as to maintain the upper level of the fluidized bed substantially constant at the interface between zone 16 and intermediate zone 18. Fluidizing gas containing entrained solids leaves the fluidized bed classifier 11 through conduit 30 and passes to cyclone 31 where the entrained solids are separated from the exhausting gas. Depending upon the specific material being classified and the dimensions of classifier 11, control means 21 is adjusted to give the appropriate classifying gas velocity through classifier 11.

It will be noted that due to the configuration of classifier 11, the uprising fluidizing gas passing therethrough moves at a much higher linear velocity through zone 16 than it does through zone 17. When the quantity of fluidizing gas being introduced through inlet 20 is regulated so as to produce an uprising gas velocity in freeboard zone 17 sufficient to just teeter a particle of a certain size, the velocity of the gas passing through fluidized bed zone 16 being greater, is capable of lifting particles of a size larger than that size which will just teeter in zone 17.

Thus, in operation, the very large particles introduced into zone 16 are fluidized and ultimately find their way to outlet 26. Also, the very finest particles introduced into zone 16 are broken free of the fluidized bed and carried through zone 17 to cyclone 31 by the uprising gas flow. Some of the intermediate size particles, those which are larger than the teeter size for zone 17 but smaller than the size which will be lifted by the gas velocity in zone 16, are carried upward into zones 18 and 17 and, upon the reduction of the velocity of the uprising gas, tend to fall backward against the uprising flow of gas back into zone 16. In zone 16 they are constantly re-thrown back into zone 18 until such time as they work their way over toward the walls of the classifier 11, slide down them, and ultimately pass out through outlet 26. Others of the intermediate size particles are trapped in the fluidized bed in zone 16 and pass through outlet 26 with the very large particles.

Due to various effects occurring within fluidized bed in zone 16, not all of the intermediate size particles are thrown up into zone 17 in the relatively short time that the particles are present in zone 16. However, by the nature of the operation of this invention, substantially all the particles of a size smaller than the teeter size for zone 17 are thrown out of the fluidized bed in zone 16 to wind up in the undersize product recovered from cyclone 31.

Based upon experimental tests performed, it has been found that it is important that the gas flow through the fluidized bed zone 16 be sufficiently high to theoretically lift from the fluidized bed particles having a size at least twice the teeter size for zone 17 (although useful improvement is obtainable at lower rates) and preferable that the velocity be such as to theoretically lift particles having a size about 2.8 times said teeter size. A greater difference in velocities between zone 16 and zone 17 does not produce any marked improvement in the separation. Of course, it must be recognized that freeboard zone 17 must be high enough to allow for the dissipation of the excess kinetic energy of the oversize particles ejected vertically upward from the fluidized bed in zone 16 so as to permit them to fall backward down toward zone 16 before they leave with the uprising gas through conduit 30. With this criteria, any substantial excess in velocity through zone 16, as would be required to lift particles much greater in size than 2.8 times the teeter size, would require an excessive height of freeboard zone 17 making the equipment larger and, therefore, more expensive.

Comparison tests between the classifier 11 of this invention and a cylindrical fluidized bed classifier (one where the zones 16, 17 and 18 are all of the same cross-sectional area) have conclusively shown amazing improvements in classification both from the standpoint of the sharpness of separation and from the standpoint of the efficiency of the operation. For example, on tests on Pocahontas coal which was 50% smaller than 150 mesh, it was found that the sharpness of separation at 150 mesh could be greatly increased while also greatly increasing the efficiency of the operation by producing a very high dust loading (grams of fine material per cu. ft. of air used for fluidization) as compared with a cylindrical column utilizing the same raw material. Specifically, dust loadings of 23–24 grams per cu. ft. were obtained with a non-uniform classifier such as is illustrated in the accompanying drawing as compared with a dust loading of only 5–7 grams per cu. ft. of fluidizing air in a uniform classifier. In this fashion, the costs of classification are greatly reduced. Also, for this type of operation, a product was produced which is directly combustible because it has sufficient coal per cu. ft. of air to burn readily whereas with the cylindrical column, the coal was not present in a sufficiently high concentration to support combustion without the addition of extra coal by other processes.

While it is not intended to be limited to the following theory, it is believed that this explanation may usefully explain why this invention produces this startling improvement in classification sharpness and efficiency.

Referring next to FIGURE 2, there is shown a particle size distribution graph wherein locations along the horizontal axis represent sizes of particles (smaller particles being toward the left and larger particles being toward the right) and heights above this axis represent quantities of particles of a particular size. Indicated on this graph is an assumed particle size distribution 51 of some particulate material it is desired to separate into two fractions; one fraction containing all the particles smaller than the size indicated by arrow 52 (which indicates the desired size of separation) and the other fraction containing all the particles larger than that size. The various lines 53, 54, 55, and 56, while indicated as straight lines on the diagram are not necessarily straight (and in all probability are curved in some fashion differing in each case).

In attempting to perform such a separation in a cylindrical fluidized bed classifier at any reasonable efficiency, the following conditions and defects may be expected:

(1) If the gas velocity is adjusted to that which theoretically would be required to produce the desired separation, the actual separation achieved would be as indicated by line 53. This means that some of the undersized particles (represented by the area AEG) will remain in the fluidized bed and be recovered with the oversized particles. While this gives an undersize fraction which is free of oversize particles, much of the undersisze material originally in the feed is lost and not recoverable in the undersize fraction.

(2) If a somewhat greater gas velocity were used, say a velocity which theoretically would produce a separation at a size equal to about one and one-half times the desired size of separation 52, the actual separation would be as indicated by line 54. This means that some of the undersized particles (represented by the area DFG) will remain in the fluidized bed and be recovered with the oversize fraction and that some of the oversized particles (represented by the area DAB) will be ejected from the bed to be recovered with the undersize fraction from the cyclone. By this procedure both the undersize and the oversize fractions can be made to contain the proper quantity of material, but each is contaminated by particles properly belonging to the other fraction.

(3) If a still greater gas velocity were used, sufficient to eject from the fluidized bed substantially all the particles smaller than the desired size of separation 52, the actual separation would be as indicated by line 55. This means that some of the oversized particles (represented by the area AGC) would also be ejected from the bed and be recovered from the cyclone admixed with the undersize fraction. While this gives an uncontaminated oversize fraction, much of the oversize material originally in the feed is lost to the cyclone product and is not recoverable in the oversize fraction.

While it is by no means certain why this behavior is exhibited, it is believed that it is a result of the crowding of solid particles in the fluidized bed causing particles to interfere with each other and causing some heterogeneity in the gas velocity distribution preventing a sharp separation at any given size of separation at reasonable efficiency.

In contrast to the above behavior, the following may be expected when performing such a separation in a fluidized bed classifier having a freeboard zone which is larger in cross-sectional area than the zone wherein the fluidized bed is maintained.

(4) If the fluidized bed classifier is so proportioned and the gas velocity is so adjusted that the gas velocity through the freeboard zone is that which would theoretically produce the desired separation and the gas velocity through the fluidized bed is that which would theoretically produce a separation at a size equal to about one and one-half times the desired size of separation, the actual separation may be considered as occurring in two stages. In the first stage, a separation as indicated by line 54 would occur in the fluidized bed in the manner indicated in illustration 2, supra. However, in the freeboard zone, that portion of the particles ejected from the bed larger than those indicated by line 56 would fall back into the bed since they are not supportable by the reduced gas velocity in the freeboard zone. This means that some of the undersize particles (represented by area DFG) will remain in the fluidized bed and be recovered with the oversize particles but that the undersize fraction recovered from the cyclone will be substantially free of oversize particles.

A comparison of the results of Example 4 with the results of Examples 1 and 2 will readily show the improved classification sharpness produced. As compared with Example 1, the separation in Example 4 produces the same purity of undersize fraction but produces a far purer oversize fraction (contaminated by the smaller amount of undersize represented by area DFG as compared with the larger amount represented by area AEG). As compared with Example 2, the separation in Example 4 produces an oversize fraction of equal purity but produces a purer undersize fraction (uncontaminated by oversize particles as compared with one contaminated by oversize particles represented by area DAB). Thus, Example 4 is a marked improvement over Examples 1 and 2, but is not perfect.

(5) If the fluidized bed classifier is so proportioned and the gas velocity is so adjusted that the gas velocity through the freeboard zone is that which would theoretically produce the desired separation and the gas velocity through the bed is that which would be capable of actually ejecting from the bed all particles smaller than the desired size of separation, the actual separation may be viewed as occurring in two stages. In the first stage, a separation as indicated by line 55 would occur in the fluidized bed in the manner indicated in illustration 3, supra. However, in the freeboard zone, that portion of the particles ejected from the bed larger than those indicated by line 56 would fall back into the bed since they are not supportable by the reduced gas velocity in the freeboard zone. Thus, the effective resultant separation achieved is that indicated by line 56.

A comparison of the results of Example 5 with those of Examples 1 to 4 will readily show the much improved sharpness of separation here produced. There are substantially no undersize particles in the oversize fraction and substantially no oversize particles in the undersize fraction recovered from the cyclone in Example 5.

The slopes of lines 53, 54, 55 and 56 may be taken as a measure of the various effects occurring in a fluidized bed classifier due to crowding of particles in the fluidized bed causing them to interfere with each other and with the flow of gas through the classifier. In the fluidized bed, there is great crowding represented by great deviation of lines 53, 54 and 55 from the vertical. In the freeboard zone, there is practically no crowding and therefore particles in the freeboard zone behave practically independently of each other as represented by line 56 being nearly vertical.

It has been found that in Examples 4 and 5, it is important that the expanded freeboard zone above the constricted fluidized bed have sufficient height to permit dissipation of the kinetic energy possessed by the particles ejected from the fluidized bed by the excess gas velocity therein. The more the cross-sectional area of the fluidized bed is reduced with a constant freeboard area, the greater will be the kinetic energy of the particles ejected from the bed, and the greater the height of freeboard required to dissipate such kinetic energy.

Thus, the ratio of cross-sectional areas (and the ratio of gas velocities) useful for this improved classification is limited to (a) sufficient to achieve the desired sharpness of the separation but (b) below that at which increased height of freeboard makes the apparatus economically unfeasible.

It has been found that the actual optimum ratios depend on many variables, such as the particle shape, the desired size of separation, and the specific gravity of the particles. The Tables I, II, and III will show the ratio of cross-sectional area of freeboard zone to cross-sectional area of fluidized bed zone (or the ratio of gas velocity in fluidized bed zone to gas velocity in freeboard zone) which permits ejection of particles from the bed of a given number of times the desired size of separation. (These tables give the area or velocity ratios for spherical particles.)

Otherwise expressed, and as substantiated by these tables, the invention teaches the operating rule for attaining the above indicated novel technical results in terms of (a) "Particle Size Ratios" which is the ratio of the largest intermediate particle size (projected from and then returning into the bed) to the desired size of separation occurring in the freeboard space, and (b) "Area Ratios," that is the ratio of the larger area of the freeboard space to the smaller area of the bed.

Thus, we find Tables I, II, III pertaining to particles having specific gravities of 10.0, 3.0, and 1.0 respectively. Each of these tables in turn has a first column of Particle Size Ratios 2.8:1, 2.0:1, and 1.4;1 related in horizontal rows (A), (B), (C) respectively to "Area Ratios" found in columns 2 to 6 for "Desired Mesh Sizes of Separation" (i.e. 150 mesh, 65 mesh, 35 mesh, 20 mesh, and 10 mesh respectively). Thus, for example, in the operation of the invention, we find that in horizontal row (B) of Table I the particle size ratio 2.0:1 is coodinated to area ratios 2.3:1, 2.0:1, 1.7:1, 1.5:1, for the respective mesh sizes of separation.

*Table I.—For Particle Mixtures Having a Specific Gravity of 10.0*

| Particle Size Ratio | Area Ratios for Desired Mesh Sizes of Separation | | | | |
|---|---|---|---|---|---|
| | 150 mesh | 65 mesh | 35 mesh | 20 mesh | 10 mesh |
| (A) 2.8:1 | 3.3:1 | 2.6:1 | 2.1:1 | 1.9:1 | 1.7:1 |
| (B) 2.0:1 | 2.3:1 | 2.0:1 | 1.7:1 | 1.5:1 | 1.5:1 |
| (C) 1.4:1 | 1.5:1 | 1.4:1 | 1.3:1 | 1.2:1 | 1.2:1 |

*Table II.—For Particle Mixtures Having a Specific Gravity of 3.0*

| Particle Size Ratio | Area Ratios for Desired Mesh Sizes of Separation | | | | |
|---|---|---|---|---|---|
| | 150 mesh | 65 mesh | 35 mesh | 20 mesh | 10 mesh |
| (A) 2.8:1 | 3.6:1 | 2.9:1 | 2.4:1 | 2.1:1 | 1.8:1 |
| (B) 2.0:1 | 2.5:1 | 2.1:1 | 1.8:1 | 1.6:1 | 1.5:1 |
| (C) 1.4:1 | 1.6:1 | 1.5:1 | 1.4:1 | 1.3:1 | 1.3:1 |

*Table III.—For Particle Mixtures Having a Specific Gravity of 1.0*

| Particle Size Ratio | Area Ratios for Desired Mesh Sizes of Separation | | | | |
|---|---|---|---|---|---|
| | 150 mesh | 65 mesh | 35 mesh | 20 mesh | 10 mesh |
| (A) 2.8:1 | 3.6:1 | 3.2:1 | 2.6:1 | 2.2:1 | 1.8:1 |
| (B) 2.0:1 | 2.5:1 | 2.2:1 | 2.0:1 | 1.7:1 | 1.6:1 |
| (C) 1.4:1 | 1.6:1 | 1.5:1 | 1.4:1 | 1.3:1 | 1.3:1 |

If the fluidized bed classifier is constructed and operated to theoretically eject particles 1.4 times the desired size of separation, a large improvement in classification sharpness results compared with a cylindrical classifier. The sharpness is further improved with a size ratio of 2.0. When a size ratio of 2.8 is used, a still further slight improvement is achieved, which cannot be substantially bettered with any further increase in size ratio (as produced by further increases in area or velocity ratios).

In summary, the invention calls for controls whereby the top level of the fluidized bed is to be held at an elevation substantially constant at the interface between the constricted zone and the intermediate transition zone. The bed is thus confined in a relatively constricted bottom zone of relatively shallow depth as compared to the substantial height of the freeboard zone above. Also the controls of the operation are such that the fluidizing gas velocity through the bed is great enough to lift or project from the bed into the freeboard zone particles of an intermediate size significantly larger than the pre-selected size at which the size separation or "split" is to be made, whereas the gas velocity in the freeboard zone is to be lower and sufficient only to sustain and carry away those particles substantially not greater than the size of separation. Under these conditions, upwardly projected intermediate size particles greater than the size of separation losing their momentum in the freeboard zone seek to migrate outwardly in all directions into the more quiescent peripheral annular portion of the freeboard zone and from there back into the fluidized bed along the periphery thereof.

In this way, the invention provides a novel mode of unit operation featuring a primary separation of fines and intermediate size emanating from the fluidized bed, followed directly by a secondary separation in the freeboard zone, subject to the controls set forth above. With these controls it is possible to effect a close separation into a coarse fraction and a fine fraction relative to a preselected size of separation.

Close fractionation or clean size fractions are thus attainable in the sense that neither fraction contains any objectionable amount of particle sizes of the other (tramp sizes) as is well illustrated by the vertical split-indicating line A—G in the diagram of FIG. 4 where the area of the curve as a whole indicates the size distribution in the feed mixture while the areas to the right and to the left of line A—G represent the respective size fractions. By contrast, the sloping lines A—E, B—F, and C—G, indicate the extent of overlap or tramp size infiltration in the respective fractions represented by the respective areas to the right and to the left of the respective sloping lines lacking the controls of the invention as in a straight vertical or non-constricted treatment chamber.

Also, aside from increasing the sharpness of the split at a required mesh size of separation, the invention increases the efficiency of the operation, for example where the seperation of a coal mixture is concerned by producing a relatively very high coal dust loading with a minimum of fluidized air required, thus capable of producing a suspension of coal in air of sufficiently high concentration to support combustion without the addition of extra coal, all of which contributes to minimize the cost of the separation or classification operation.

While this invention has been described and illustrated in certain embodiments, it is readily apparent equivalents exist for specific details contained in the illustrative embodiments. It is intended that all such equivalents as may be embraced within the scope of the subjoined claims are to be considered as part of this invention.

We claim:

1. A process for separating a mass of particulate solids of mixed sizes into a first fraction consisting essentially of particles smaller than a preselected size of separation and a second fraction consisting essentially of particles larger than said preselected size of separation, which comprises establishing a fluidized bed of particles from said mass of particulate solids with a fluidizing gas rising through the bed maintained at a shallow depth relative to a substantial height of a freeboard zone above it, controlling the rate of gas flow through the bed so that the gas velocity is great enough to project from said bed into the freeboard zone particles of an intermediate size significantly larger than said preselected size of separation, maintaining in the freeboard zone a relatively lower upward gas velocity sufficient only for sustaining and carrying away particles substantially not greater than said size of separation while said projected larger intermediate size particles losing their momentum in the upper portion of said freeboard zone fall back into the fluidized bed through an intermediate zone constituting the transition between the freeboard zone and the relatively constricted fluidized bed, with said intermediate size particles returning to the bed; continuously supplying said particulate solids to said fluidized bed, continuously removing from said freeboard zone the particles comprising the first fraction suspended in the fluidizing gas, continuously removing from said fluidized bed the particles comprising said second fraction including said projected and returned intermediate particle size, and controlling the effective top level of said bed in the fluidized state so as to maintain said level at an elevation substantially constant at the interface between said bed and said intermediate zone.

2. A process as defined in claim 1, wherein said gas passing through the fluidized bed has a velocity at least great enough to lift from said fluidized bed into the freeboard zone particles having a size at least twice said preselected size of separation.

3. A process as defined in claim 1, wherein said gas velocity is approximately that required to lift from said fluidized bed particles having a size about 2.8 times the preselected size of separation.

4. Apparatus for separating a mass of particulate solids into a first fraction consisting essentially of particles smaller than a preselected size of separation and a second fraction consisting essentially of particles larger than said preselected size, which comprises a vertical through-flow treatment chamber having a lower vertical end portion, and an expanded vertical upper end portion of a cross-sectional area as well as height substantially greater than that of said lower end portion; an intermediate transitional portion between said lower and said upper expanded portions of the treatment chamber; means for supplying said particulate solids to said lower end portion for establishing therein a fluidized bed of said solids of relatively shallow depth with the width of the bed significantly greater than the depth; means for producing a relatively uniform upflow of fluidizing gas through said bed for maintaining the same in fluidized condition; means for controlling the rate of fluidizing gas so that solids of intermediate size substantially greater than said preselected size are lifted from said bed into said expanded portion only to fall back into the bed while the particles constituting said first fraction are carried away with the fluidizing gas; means for passing said first fraction from the expanded portion of said chamber; means for removing from said lower end portion the particles constituting said second fraction including said intermediate size; and means for controlling the operation of the bed so that the top level thereof in the fluidized state is maintainable substantially at the juncture of said lower end portion and said intermediate portion of the treatment chamber.

5. Apparatus as defined in claim 4, wherein said upper portion of the treatment chamber has a cross-sectional area 1.5 to 2.8 times the cross-sectional area of said lower end portion of said chamber, and wherein the diameter of the end portion containing said bed is significantly larger than the depth of said bed.

6. Apparatus as defined in claim 4, wherein the cross-sectional area of said upper portion of the treatment chamber is about two times the cross-sectional area of said lower end portion of the chamber, and wherein the diameter of the end portion containing said bed is significantly larger than the depth of said bed.

7. Apparatus as defined in claim 4, wherein said means for introducing particulate solids into fluidized bed zone has a delivery end spaced upwardly from said top level of the bed so as to allow the particulate solids to fall from a region above the fluidized bed against the rising stream of gas so as to encourage therein the separation of the particles of the first fraction.

8. The process according to claim 1, wherein the ratio as between the gas velocities in the fluidized bed and the gas velocities in the freeboard zone is in a range of from about 1.2:1 to about 4.3:1, wherein the fluidizing gas passing through the bed has a velocity at least great enough to lift from said fluidized bed into the freeboard zone particles having a size from about 1.4 to about 2.8 times said preselected size of separation, wherein the size of separation is in a range of from about 10 mesh to about 150 mesh, and wherein the particles of the material being classified have a specific gravity from about 1.0 to about 10.0.

9. The process according to claim 1, wherein the ratio as between the gas velocities in the fluidized bed and the gas velocities in the freeboard zone is in a range of from about 1.5:1 to about 2.8:1 wherein the fluidizing gas passing through the bed has a velocity at least great enough to lift from said fluidized bed into the freeboard zone particles having a size in the order of twice said preselected size of separation, and wherein the size of separation is from about 10 mesh to about 150 mesh, and wherein the particles of the material being classified have a specific gravity of from about 1.0 to about 10.0.

References Cited in the file of this patent
UNITED STATES PATENTS

| | | |
|---|---|---|
| 2,511,088 | Whaley | June 13, 1950 |
| 2,666,526 | Odell | Jan. 19, 1954 |
| 2,741,549 | Russell | Apr. 10, 1956 |
| 2,899,384 | Swabb | Aug. 11, 1959 |